3,154,957
INFINITELY VARIABLE SPEED CHANGE GEAR
UTILIZING A BALL
Manabu Kashihara, 12 Karahashi-Hanazono-cho,
Minami-ku, Kyoto, Japan
Filed Oct. 3, 1962, Ser. No. 228,181
Claims priority, application Japan, Oct. 16, 1961,
36/37,455, 36/37,456
3 Claims. (Cl. 74—198)

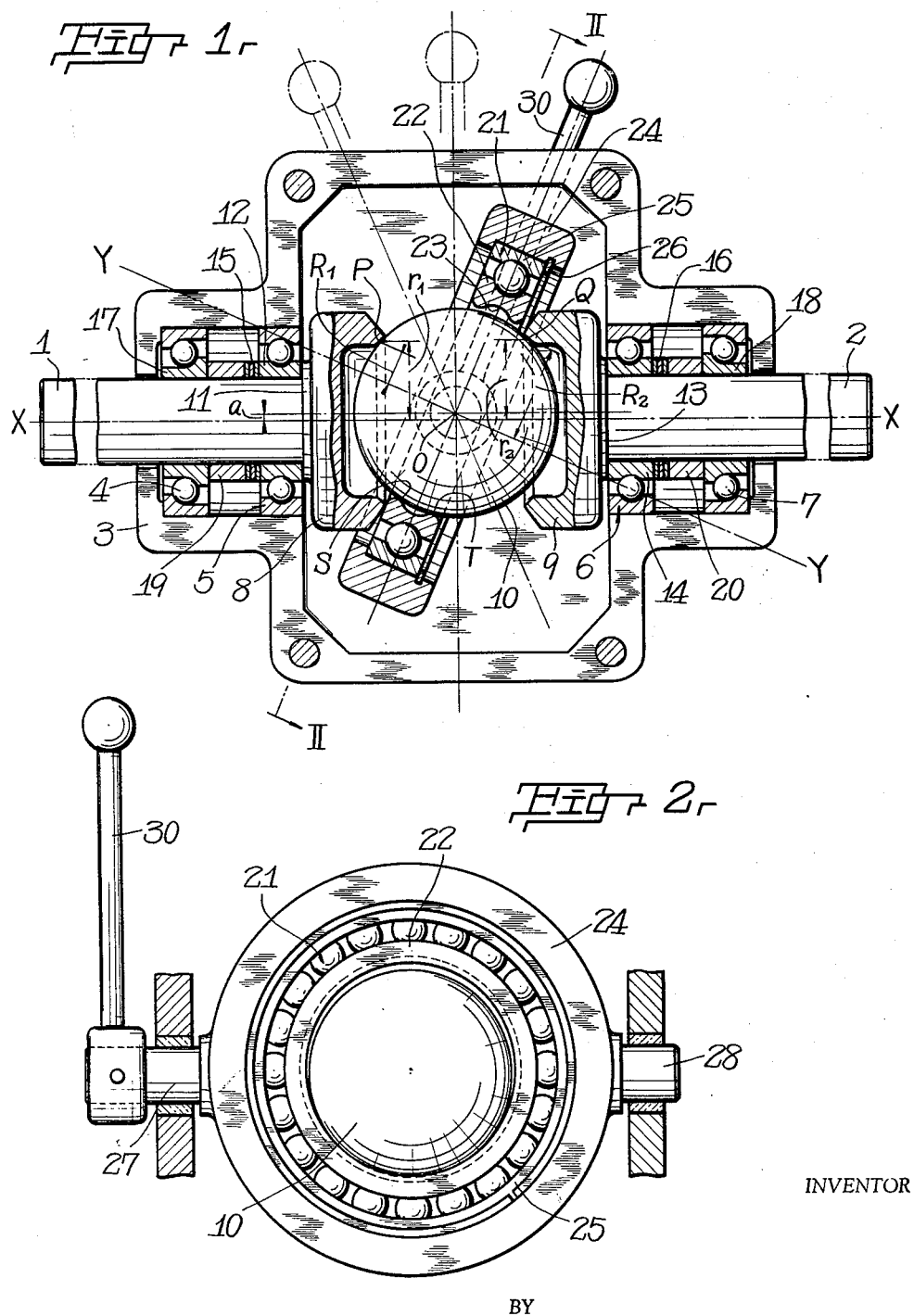

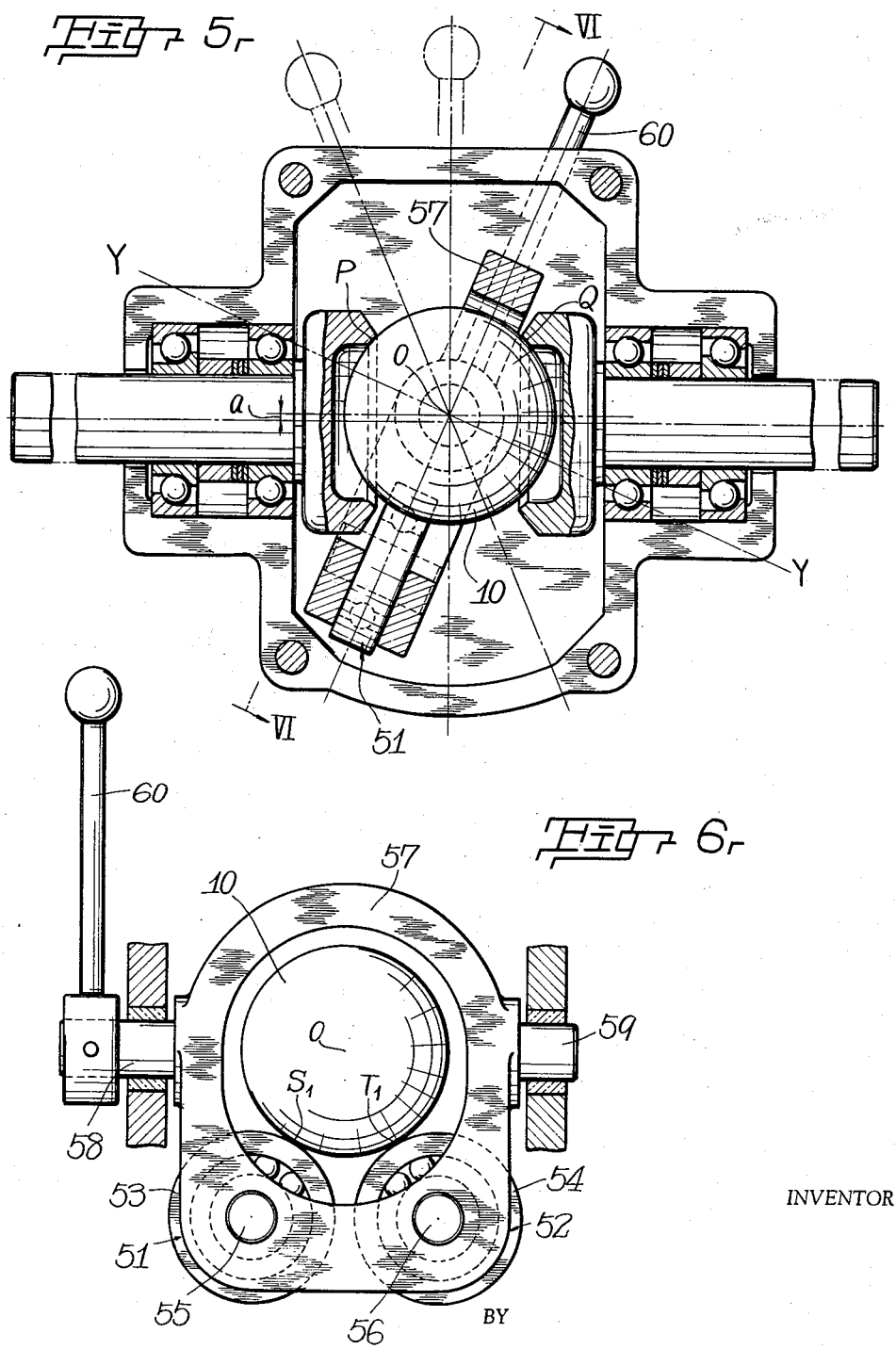

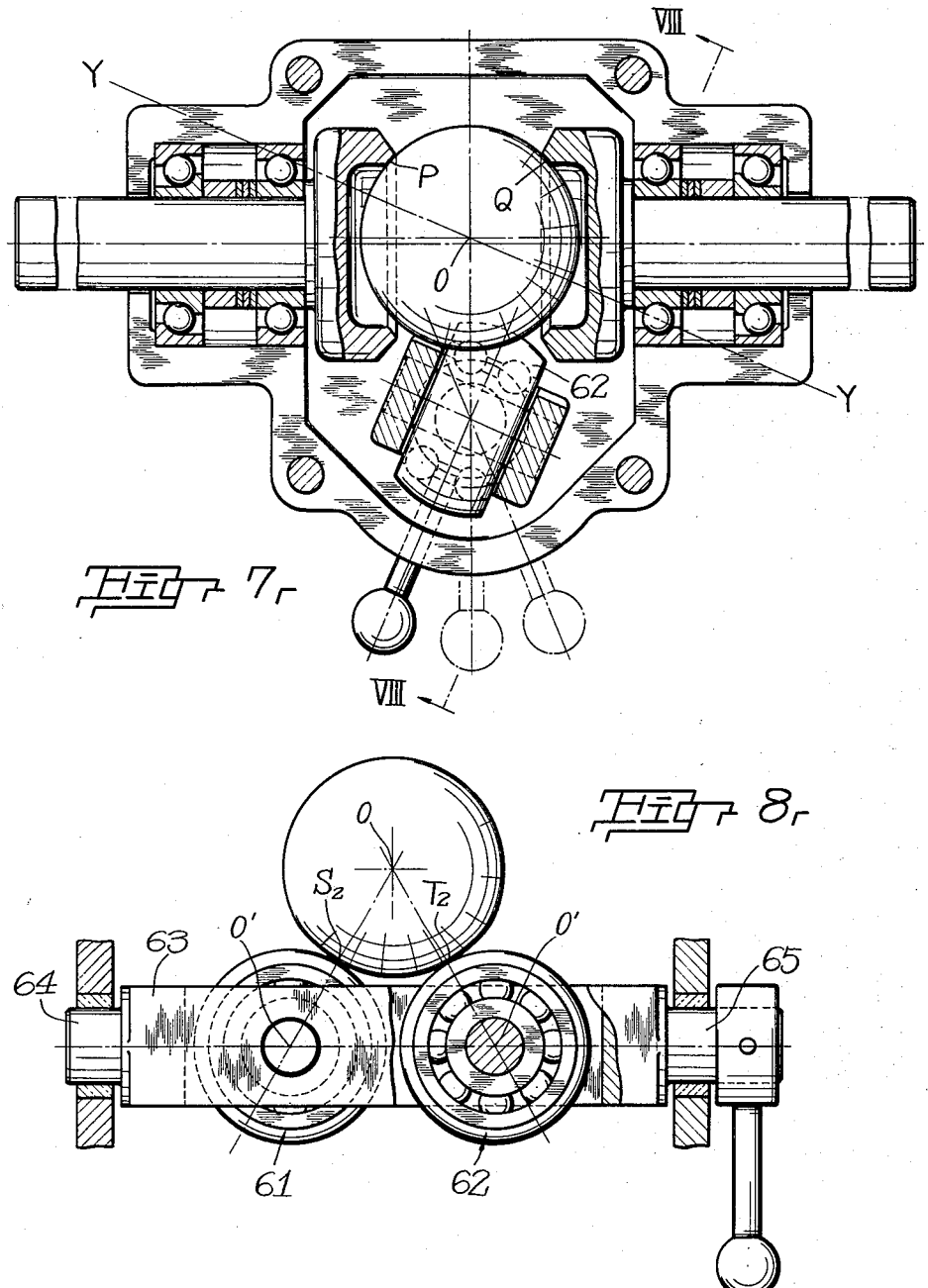

This invention relates to infinitely variable speed change gear which utilizes a single ball as an element for varying the speed of the driven shaft.

Heretofore, various types of infinitely variable speed change gears which utilize a ball or balls are known. But, as far as I know, they can not satisfy all of the conditions which are required from the point of pressure contact, from the point of support of the ball and from the point of assembling and disassembling of the gear.

Thus the present invention aims to provide an infinitely variable speed change gear wherein all of the above mentioned conditions are satisfactory. And according to the present invention there is provided an infinitely variable speed change gear comprising a driving shaft and a driven shaft arranged coaxially, a dish-shaped driving wheel provided on an end of the driving shaft, a dish-shaped driven wheel provided on that end of the driven shaft confronting the driving wheel, a single ball arranged between the driving wheel and the driven wheel, the ball being arranged to contact with the driving wheel and the driven wheel at one point respectively and to position its center on a definite point near the common axis of the driving shaft and the driven shaft, means for maintaining contact between the ball and the wheels and also for adding two other contact points for the ball so as to provide a spinning axis for the ball, and means for changing the inclination of said spinning axis.

One feature of the gear according to the present invention consists in that the gear utilizes a single ball under the agreeable condition wherein the driving shaft and the driven shaft are arranged coaxially. And another feature of the gear according to the present invention consists in that the gear utilizes a single ball which has a diameter sufficiently large, compared with those of the driving wheel and the driven wheel, to enable the transmission of a relatively large torque.

Other features and the advantages of the present invention will be apparent from the following description taken with the accompanying drawings in which;

FIG. 1 is a longitudinal sectional view of an infinitely variable speed change gear according to the present invention;

FIG. 2 is a side view of the members for changing the speed of the gear seen in the II—II plane of FIG. 1;

FIG. 5 is a longitudinal sectional view of another gear according to the present invention;

FIG. 6 is a side view of the speed changing members seen in the VI—VI plane of FIG. 5;

FIG. 7 is a longitudinal sectional view of another gear according to the present invention; and FIG. 8 is a side view of the speed changing members seen in the VIII—VIII plane of FIG. 7.

Figure 3:
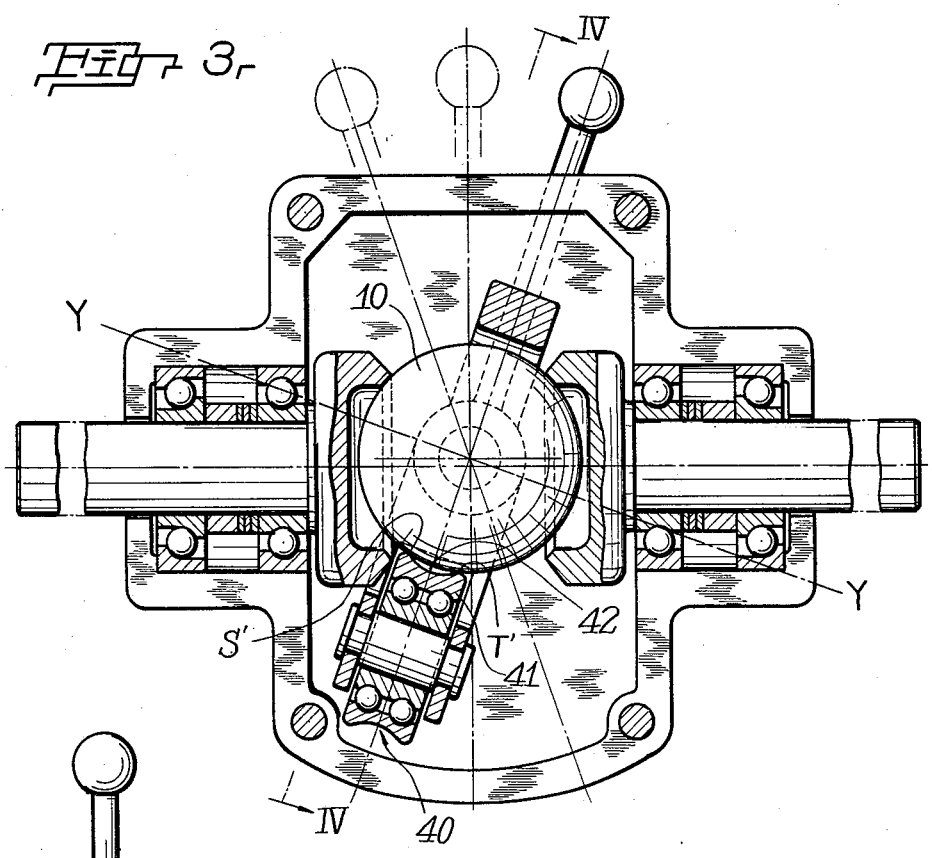
FIG. 3 is a longitudinal sectional view of another infinitely variable speed change gear according to the present invention.

Referring to the drawings, the gear shown in FIG. 1 and FIG. 2 comprises a driving shaft 1 and a driven shaft 2 arranged coaxially. These shafts are supported by ball bearings 4–7 which are provided in a casing 3, and with their inner races capable of rotating about a common line X—X. A dish-shaped driving wheel 8 and a dish-shaped driven wheel 9 are provided on the end of the driving shaft and on the end of the driven shaft respectively. The driving wheel 8 and the driven wheel 9 are integrally formed with the driving shaft and the driven shaft respectively. The rim parts of these wheels which are adapted to contact a ball 10 have an axial line X—X. The driving wheel 8 rests on the side surface of the inner race 12 of the bearing 5 at its rear seat 11, and the driven wheel 9 rests on the side surface of the inner race 14 of the bearing 6 at its rear seat 13.

Leaf springs 15, which generate engaging pressure, and a distance piece 19 are arranged between the inner race 17 of the bearing 4 and the inner race 12 of the bearing 5, and similarly leaf springs 16, which generate engaging pressure, and a distance piece 20 are arranged between the inner race 18 of the bearing 7 and the inner race 14 of the bearing 6. The ball 10 contacts the driving wheel only at one point P, and also contacts the driven wheel only at one point Q. Accordingly, the center O of the ball takes a definite position which is off from the axis X—X in an amount "$a$." A ball bearing 21 is provided, the inner race of which bearing contacts the ball at two points S and T, and, to make such a contact possible, a concave surface 23 is provided on it. The outer race 25 of the bearing 21 is rotatively supported by a supporting member 24 and is prevented from falling out of member 24 by a snap ring 26. As shown in FIG. 2, the supporting member 24 is provided with a pair of pins 27, 28 and is rotatively supported by the casing by means of these pins. The supporting member may be swiveled by an operating handle 30 attached to the pin 27.

The ball 10 in the above explained gear contacts driving wheel 8, driven wheel 9 and the bearing 21 at four points, that is to say at points P, Q, S and T. The spinning axis of the ball 10 is determined by a normal line Y—Y and the speed change ratio "$m$" may be given by the following equation:

$$m = \frac{r_1}{R_1} \cdot \frac{R_2}{r_2}$$

Wherein $R_1$ is the distance between the point P and the normal line Y—Y;
$R_2$ is the distance between the point Q and the normal line Y—Y;
$r_1$ is the distance between the point P and the axial line X—X;
$r_2$ is the distance between the point Q and the axial line X—X.

In case of the gear shown in FIG. 1, $r_1$ is equal to $r_2$, and the speed change ratio "$m$" may be shown by the following simplified form:

$$m = \frac{R_2}{R_1}$$

Figure 4:
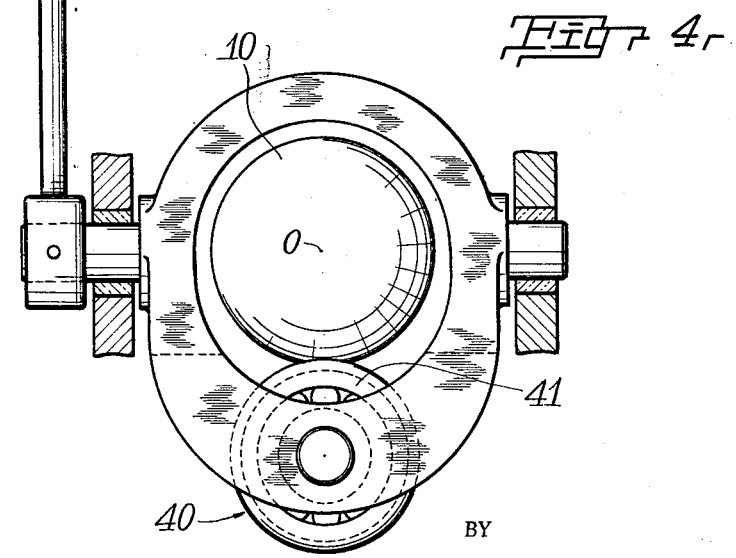
FIG. 4 is a side view of the members for changing the speed of the gear seen in the IV—IV plane of FIG. 3.

The infinitely variable speed change gear shown in FIG. 3 and FIG. 4 has a similar construction in comparison with the gear shown in FIG. 1 and FIG. 2, but, in the case of this gear the spinning axis of the ball 10 is determined by a bearing 40. This bearing has an outer race 41 with a concave surface 42. The outer race 41 contacts the ball externally at two points S', T' so as to provide a spinning axis Y—Y for the ball.

In both cases shown in FIG. 1 and in FIG. 3, the points which determine the spinning axis for the ball are on a large circle which passes through the contact point P and contact point Q, but in case of the gears shown in FIG. 5 and in FIG. 7 they are on another large circle which is perpendicular to the first said large circle.

Referring to FIG. 5 and FIG. 6, the infinitely variable speed change gear comprises a similar construction for the driving wheel and the driven wheel compared with that of the gear shown in FIG. 1 and FIG. 3. But in this gear there are provided two bearings 51, 52 and the outer races 53, 54 of these bearings contact with the ball 10 at $S_1$ and $T_1$ respectively. The shafts 55, 56 of these bearings are supported by a supporting member 57 which is capable of swinging about a pair of pins 58, 59 by means of an operating handle 60. The large circle which passes through the contact points P and Q or the plane which contains the point P, Q and O is perpendicular to the large circle which passes through the points $S_1$ and $T_1$ or the plane which contains the points $S_1$, $T_1$ and O. The ball 10 is given its spinning axis Y—Y by the constraint produced by the contacts at $S_1$ and $T_1$.

The gear shown in FIG. 7 and FIG. 8 is a modification of the gear shown in FIG. 6 and FIG. 7 and is provided with a pair of bearings 61, 62. These bearings are supported by a supporting member 63 which is capable of swinging about pins 64, 65. But in case of this gear the center line of the pins 64, 65 does not pass through the point O, that is to say the center of the ball 10. Thus, in case of this embodiment, a special convex profile is required for the peripheral surfaces of the outer races of the bearings 61, 62 so as to maintain the distance O, O' constant. The points O', O' are the centers of the bearings 61, 62.

As seen in the four embodiments of the present invention, in case of the infinitely variable speed change gear according to the present invention, small circles and/or large circles on the same spherical surface of a single ball are utilized conveniently for speed change.

What I claim is:

1. Infinitely variable speed change gear comprising a driving shaft and a driven shaft arranged coaxially; a dish-shaped driving wheel provided on an end of the driving shaft; a dish-shaped driven wheel provided on that end of the driven shaft which confronts the driving wheel; a single ball arranged between the driving wheel and the driven wheel, the ball being arranged in contact with the driving wheel at a single point and with the driven wheel at a single point respectively and with its center at a definite point near the common axis of the driving shaft and the driven shaft; a bearing member, having inner and outer races for maintaining contact between the ball and the driving and driven wheels and also for adding two other contact points for the ball, the inner race of said bearing being adapted to provide the latter two contact points so as to provide a spinning axis for the ball; a supporting member for supporting the bearing so as to be swivelable about the center of the ball; and an operating means for swiveling the supporting member for changing the inclination of said spinning axis.

2. Infinitely variable speed change gear as defined in claim 1, wherein the outer race of said bearing is adapted to provide said two other contact points so as to give a spinning axis for the ball.

3. Infinitely variable speed change gear as defined in claim 1, characterized in that two bearing members are provided for maintaining contact between the ball and the wheels and also for providing two other contact points for the ball, the outer races of said bearing members being adapted to provide the latter two contact points so as to give a spinning axis for the ball; a supporting member for supporting the bearing members so as to be swiveled about the center of the ball; and an operating means on the supporting member for changing the inclination of said spinning axis.

References Cited in the file of this patent

UNITED STATES PATENTS 2,727,396     Haugwitz _____ Dec. 20, 1955

FOREIGN PATENTS 592,320     Great Britain _____ Sept. 15, 1947